(12) United States Patent
Elliott

(10) Patent No.: US 6,446,053 B1
(45) Date of Patent: Sep. 3, 2002

(54) COMPUTER-IMPLEMENTED METHOD AND SYSTEM FOR PRODUCING A PROPOSAL FOR A CONSTRUCTION PROJECT

(76) Inventor: Michael Elliott, P.O. Box 1272, Solvang, CA (US) 93464

(*) Notice: Subject to any disclaimer, the term of this patent is extended or adjusted under 35 U.S.C. 154(b) by 0 days.

(21) Appl. No.: 09/370,114

(22) Filed: Aug. 6, 1999

(51) Int. Cl.[7] .............................................. G06F 17/60
(52) U.S. Cl. ...................... 705/400; 703/1; 707/104.1
(58) Field of Search ....................... 703/1; 705/1, 400; 707/10, 104.1

(56) References Cited

U.S. PATENT DOCUMENTS

| | | | |
|---|---|---|---|
| 4,811,243 A | * 3/1989 | Racine | 345/863 |
| 5,655,087 A | 8/1997 | Hino et al. | |
| 5,668,736 A | * 9/1997 | Douglas et al. | 703/1 |
| 5,761,674 A | * 6/1998 | Ito | 707/104.1 |
| 5,793,632 A | 8/1998 | Fad et al. | |
| 5,862,223 A | 1/1999 | Walker et al. | |
| 5,870,771 A | 2/1999 | Oberg | |
| 5,890,138 A | 3/1999 | Godin et al. | |
| 5,890,175 A | 3/1999 | Wong et al. | |
| 5,893,082 A | * 4/1999 | McCormick | 705/400 |

FOREIGN PATENT DOCUMENTS

| | | |
|---|---|---|
| EP | 0823687 A1 | 2/1998 |
| JP | 09091 | 4/1997 |
| WO | WO 01/55928 A1 * | 8/2001 |

OTHER PUBLICATIONS

"Construction Industry is Building a Web Presence"; San Jose Mercury News (SJ), Tuesday Nov. 2, 1999 Morning Final Section: Business p. 4C.*

"Revit Technology Corporation Launches Revit Release 4.0"; Business Wire, Oct. 16, 2001, p. 0440.*

Visual Applications, "VisualPhile Features and Benefits", Promotioal letter, 1996 (3 pages).

Visual Applications, Website pages, 1999 (3 pages).

Cadsoft, Brochure, no date (6 pages).

Cadsoft, Website pages, 1999 (3pages).

Autodesk, Press Release, 1999 (3 pages).

ImproveNet, Website pages, 1999 (3 pages).

* cited by examiner

Primary Examiner—Edward R. Cosimano
(74) Attorney, Agent, or Firm—Fish & Richardson P.C.

(57) ABSTRACT

A computerized system includes a central site with various databases and a user site connected for electronic communication over a networked communication system such as the Internet. The user site includes a computer having stored in memory an application that enables a user to develop a construction proposal including a detailed graphical model and a detailed cost estimate model, have the proposal submitted electronically over a networked communication system to a construction professional for a bid, and receive a response on the proposal from the construction professional over the networked communications system. The user accomplishes all of these tasks from a single computer environment. The application educates the user as it guides the user through a series of construction phases and steps, prompting the user to input critical information and make appropriate selections throughout the series of phases and steps.

16 Claims, 11 Drawing Sheets

COMPUTER-IMPLEMENTED METHOD AND SYSTEM FOR PRODUCING A PROPOSAL FOR A CONSTRUCTION PROJECT

BACKGROUND OF THE INVENTION

An individual considering a major construction project such as building his dream house or remodeling his existing home needs to forecast important details of the project. To create a reasonably accurate forecast, the individual (hereinafter called "the owner") must try to answer the following questions: What will the new or remodeled house will look like when completed; What will the project cost; How long will the project take to complete; and Who will do the work? In the process of trying to answer these questions, the owner can determine if the project is economically feasible. If the owner decides to undertake the project, a reasonably clear forecast can prevent costly price overruns and construction delays.

However, answering these questions is difficult for unsophisticated builders. Forming a clear mental image of the completed project can be difficult, even with detailed blueprints and plans. Large projects such as building a house include many construction phases and require many different types of building materials. Calculating the material quantities and costs can be very complicated. Large projects also require hiring several different types of subcontractors. The associated labor costs are difficult to estimate without experience in working with such contractors. Labor cost estimates introduce additional complexities in that labor rates vary by region and the specialty of the subcontractors. Further, there are costs the inexperienced builder might not consider, such as building permit fees, inspector's fees and builder's risk insurance. In addition since many owners are first time builders, it may be difficult for them to locate and hire the appropriate subcontractors for their project.

For complicated projects such as building a house or a major remodel of an existing house, many owners hire a general contractor to provide the estimates described above and to hire and manage the subcontractors to do the work. However, any miscommunication with the general contractor as to what the owner wants or expects can lead to unfortunate mistakes that may be prohibitively expensive and time consuming to correct. Further, the uninformed owner has no assurance that the general contractor's estimate is reasonable. The fees charged by general contractors are substantial, adding significantly to the cost of the project. Also, hiring a general contractor entails loosing a large degree of control over the project. For these reasons, hiring a general contractor may not appeal to all owners.

Some owners forgo hiring a general contractor in an effort to retain control over the project and cut costs. According to some estimates, an owner can save anywhere from 10% to 25% of overall building costs by acting as his own general contractor. On the other hand, the owner's lack of experience can negate these savings if it leads to cost overruns and construction delays. Further, lenders at financial institutions may be leery of lending to owners acting as their own general contractors. Many lenders associate lack of experience with delays, shoddy construction, and even failure to complete a project. Subcontractors might not want to work with a novice if they anticipate that the owner's inexperience will cause them delays and callbacks. In order to reassure the lender and subcontractors of the owner's abilities, it is essential that the owner has a clear set of plans, knowledge of all necessary phases of construction, and a detailed and reasonably accurate estimate of the costs involved.

Computer applications have been developed for the construction industry that create digital images of potential construction projects and others that generate cost estimates for such projects. A computer application called VisualPhile produced by Visual Applications in North Kansas City, Mo. allows a user to modify an existing digital image of a home by incorporating materials selected from a catalog of digital images into an existing digital image to create an approximation of the completed project. U.S. Pat. No. 5,893,082 to McCormick discloses a material cost estimating computer application for the construction industry. However, these applications are designed for construction professionals who are intimately familiar with the various phases and requirements of a given construction project. Any graphical model or cost estimate model produced by an owner with little or no building experience using these tools would probably be incomplete and hence inaccurate.

Accordingly, a need exists for a tool that enables owners to accomplish the tasks usually performed by a general contractor. These tasks include producing a set of preliminary building plans and a detailed cost estimate and soliciting bids from subcontractors.

BRIEF SUMMARY OF THE INVENTION

According to a preferred embodiment of the invention, a computer implemented method and system enables a user to develop a construction proposal including a detailed graphical model and a detailed cost estimate model. The proposal is submitted electronically over a networked communication system to a construction professional for a bid, and the user receives a response from the construction professional over the networked communications system. According to the preferred embodiment, the user accomplishes all of these tasks from a single computer environment. A computer application installed on the user's computer educates the user as it guides the user through a series of construction phases and steps, prompting the user to input critical information and make appropriate selections throughout the series of phases and steps.

According to the preferred embodiment, the system includes a central site and a user site connected for electronic communication through the networked communications system. The central site includes a first database that contains product descriptions supplied by a number of subscribing suppliers. The product descriptions include a digital image and a cost-per-unit data for that particular product. The central site also includes a second database that contains contact data for a number of subscribing construction professionals. The user site includes a computer having stored in memory an application that guides the user through the following steps: create an initial graphical model and store it in a first memory; create an initial cost estimate model and store it in a second memory; prompt the user to create the construction proposal in a series of construction phases and steps; access product descriptions from the first database associated with a particular one of the construction steps and prompt the user to select from them; update the graphical model by incorporating the digital image of the selected product description into the existing graphical model in the first memory; update the cost estimate model by calculating a cost of the selected product from the corresponding cost-per-unit data, incorporate the cost into the existing cost estimate model in the second memory, and store the updated cost estimate model in the second memory; display a completed construction proposal on the user's display screen; access the second database and display the contact information of at least one construction professional; and electronically transmit the completed construction proposal to a selected one of the displayed construction professionals.

According to an alternate embodiment, the user transmits the completed construction proposal to the central site. The appropriate construction professional(s) are selected at the central site. The proposal is then sent to the selected construction professional(s) for bidding, along with contact data for the user. The construction professional(s) then transmit bids to the user via the networked communication system.

BRIEF DESCRIPTION OF THE DRAWINGS

These and other features of this invention are more fully set forth in the following description of presently preferred embodiments of the invention. The description is presented with reference to the accompanying drawings in which:

FIGS. 2D and 2E describing the alternate steps;

DETAILED DESCRIPTION OF PREFERRED EMBODIMENTS

According to a preferred embodiment of the invention, a computer-implemented application and system enables a user to create a comprehensive proposal for a construction project and submit the proposal for a bid to construction professionals all from the user's computer. The proposal includes a detailed graphical model and associated detailed cost estimate of a construction project to be completed. The application guides the user through construction phases and steps appropriate for the proposed project, adding to and revising the details of an originally input initial model. Once the user is finished, the application directs the user to the construction professionals appropriate for the needs of the project and puts the user in contact with those construction professionals. Thus, the application allows the user to create the proposal, submit it for bid, and receive a bid all from the user's computer.

Figure 1:
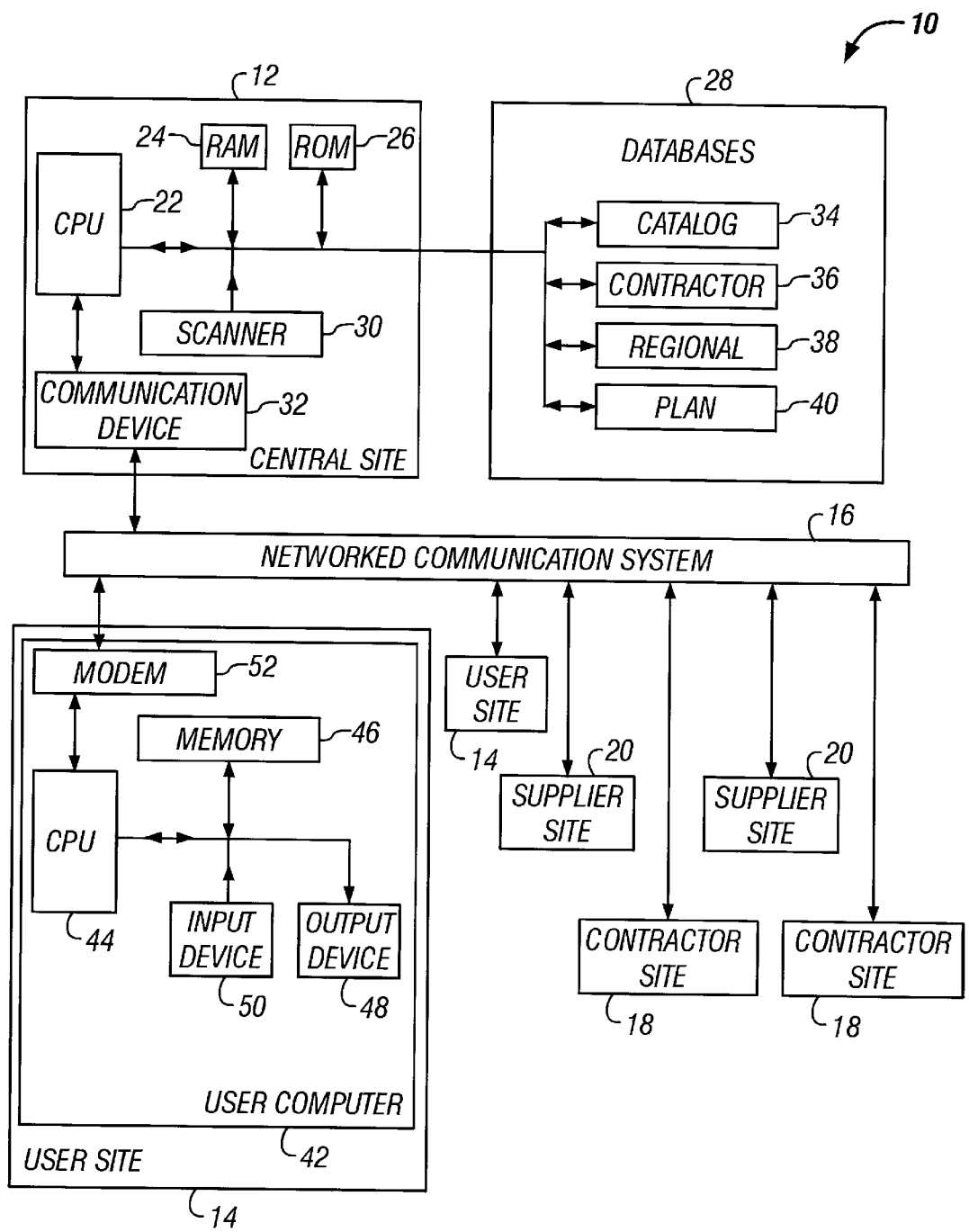
FIG. 1 is a diagram of a system according to one embodiment of the invention.

As shown in FIG. 1, the system 10 includes a central site 12 acting as a host computer and at least one user site 14. These two sites, or "nodes", are connected electronically through a networked communication system 16 such as the Internet. Preferably the system includes other nodes, for example, subscribing contractor sites 18 and subscribing supplier sites 20.

The central site includes a CPU 22, RAM 24, ROM 26, data storage device 28, image scanning device 30, and a communication device 32. The data storage device contains several databases including a catalog database 34, regional database 36, contractor database 38, and plan database 40. The data storage device can be selected from any number of devices suited for storage of relatively large databases. These include, for example, magnetic hard disc, optical disc such as CD ROM or DVD, flash memory or any combination of such devices as different databases may reside in different data storage devices.

Catalog database 34 contains product data for a comprehensive set of building materials offered by a number of subscribing suppliers. The product data for each product includes the supplier name, supplier contact information, product description and/or code, cost-per-unit of the product, and depending on the nature of the product, a digital image of the product. For example, tile and carpet entries are major aesthetic features of a house and the corresponding product data would include a digital image. Structural lumber on the other hand is hidden and hence the corresponding product data may not include a digital image. The product data would be received at central site 12 from a number of suppliers.

In a preferred embodiment, the suppliers subscribe to a service offered by a central site operator and submit product information electronically via the networked communication system. According to this embodiment, the suppliers enter and update information in the catalog database directly. For security, the suppliers' access to the catalog database is limited. Each supplier has an identification code and associated password that allows him or her to access the database, but only edit product data offered by that supplier. According to an alternate embodiment, the suppliers submit information in the form of magnetic or optical disc to the central site which is then loaded into the database by an operator.

Contractor database 36 contains data on all subscribing contractors. These contractors include for example construction professionals such as general contractors, architects, designers, carpenters, masonry subcontractors, roofing subcontractors, and electrical subcontractors. The contractor database may also include other professionals that may be involved in a construction project such as building inspectors, attorneys, and real estate brokers. The database includes several data fields including, for example, contractor identification code, regional information (such as zip code), contact information, specialty, and labor rate. Contact information can include address, phone number, fax number, e-mail address, website address, and the contractor identification code for communication through the central site.

Regional database 38 contains average labor costs by region and building permit costs by region. As used herein, "region" can be defined broadly as geographic area as large as the "Pacific Northwest", or as narrowly as a radius of a few miles surrounding the prospective building site. Convenient parameters for the region field in regional database 38 include "state", "county", and/or "zip code". According to one embodiment, the average labor costs are input from compiled reports such as that provided periodically by Dodge Construction Systems Costs published by McGraw-Hill Cost Information Systems. Alternatively, labor costs are calculated by region from the specific labor rates supplied by the contractors in the contractor database. Labor rates are sorted by particular region and specialty and then calculated in CPU 22 for an average labor rate for a given specialty in that particular region. The regional database also preferably contains other costs that vary by region such as the average cost of builder's risk insurance, average price of land, and local tax rates.

Plan database 40 contains a wide range of blue prints and building plans that can be accessed by the user when setting up an initial graphical model for the image modeling process. The plans are preferably in a format that may be downloaded to the user site and then edited and customized to fit the users needs. Preferably the plan database also includes installation time factors for various regions and contractor specialties. These installation time factors are used to calculate the time estimates for various construction steps as described below in the descriptions of FIGS. 5 and 6.

The databases are update regularly to maintain their accuracy.

As stated above, central site 12 also acts as host computer in the networked communication system for the users, suppliers, and contractors. Preferably the central site is connected to networked communication system 16 through communication device 32 connected to a relatively high bandwidth digital transmission line such as a Digital Subscriber Line (DSL) or cable connection.

User site 14 includes user computer 42. The user computer is a general purpose computer including a CPU 44, memory 46, output device 48 that may include a printer, and display device, and input device 50 that may include a keyboard and scanner and a modem 52 for connection to the networked communication system, as well as appropriate software for control and coordination of all computer components. Preferably the modem is connected to a relatively high bandwidth digital transmission line such as a DSL or cable connection.

The application is preferably installed as a software package on the hard disc of the user computer.

Operation

A preferred embodiment of the invention will now be described as a computer-implemented method and system utilized by the user to create a proposal for construction of a house. The application controls user computer 42 to simulate construction of an actual project, and to guide the user through the appropriate steps to ensure the simulation is comprehensive and reasonably accurate. The final result is a complete construction project proposal including a complete graphical model and a complete cost estimate model.

Details of the process of creating the proposal are shown generally in FIGS. 2A–2F. The application prompts the user to select a starting point at step 100 by inputting an initial graphical model at 101. In the present example of building a house, the initial graphical model is a lot of land. The initial graphical model may be derived from a photograph of the lot scanned into the computer at the user site. If the user does not have a scanner, the photograph may be physically sent to the central site and the photograph scanned there and stored as a digital image. This digital image can then either be sent to the user on disc, or downloaded to the user via the networked communication system. Alternatively, the initial graphical model may be selected from a variety of templates stored in the user computer's memory when initially installing the application and/or accessed through the central site plan database 40. The graphical model primarily consists of graphical data, and that graphical portion is stored in a graphical data memory The user is prompted to enter critical dimensions for the lot at 102. These dimensions may include length, width, elevation at certain points, and grade. The initial graphical model is then stored in memory and serves as the base for the complete graphical model. User computer 42 calculates the square footage of the lot from the user entered dimensions and stores this information in memory.

The initial cost estimate model has a starting point of $0.00. The cost estimate model primarily consists of text and numbers, and that alphanumeric portion is stored in an alphanumeric data memory.

The graphical data memory and alphanumeric data memory may be contained in different locations of the same memory device.

The user is also prompted to enter geographic data corresponding to the location of the site at 103. The geographic data may include a state, town, and/or zip code. This geographic data is stored in the user computer memory.

Figure 2A:
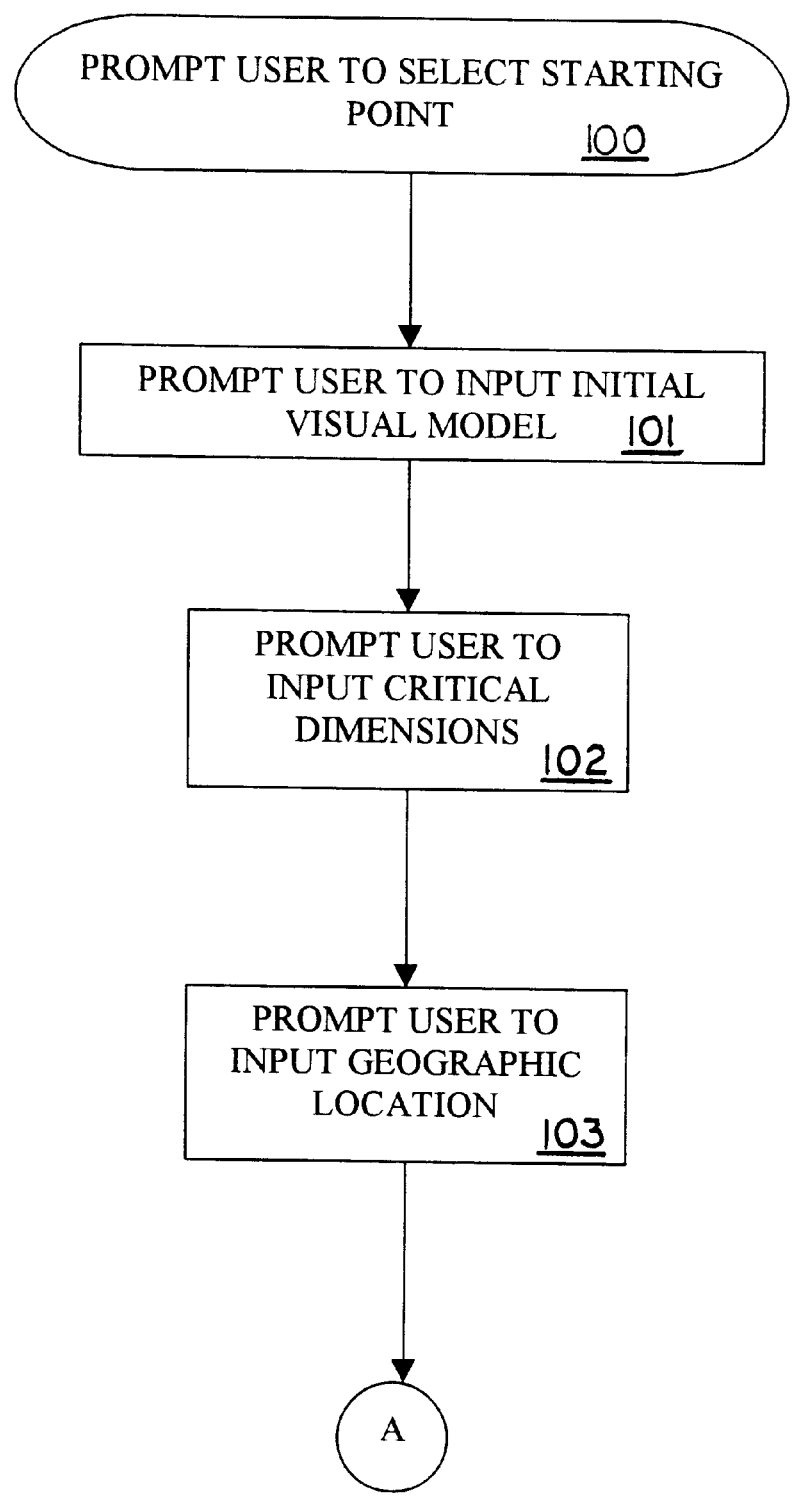
FIGS. 2A–2F are flowcharts describing a method according to alternate embodiments of the invention.
Figure 2B:
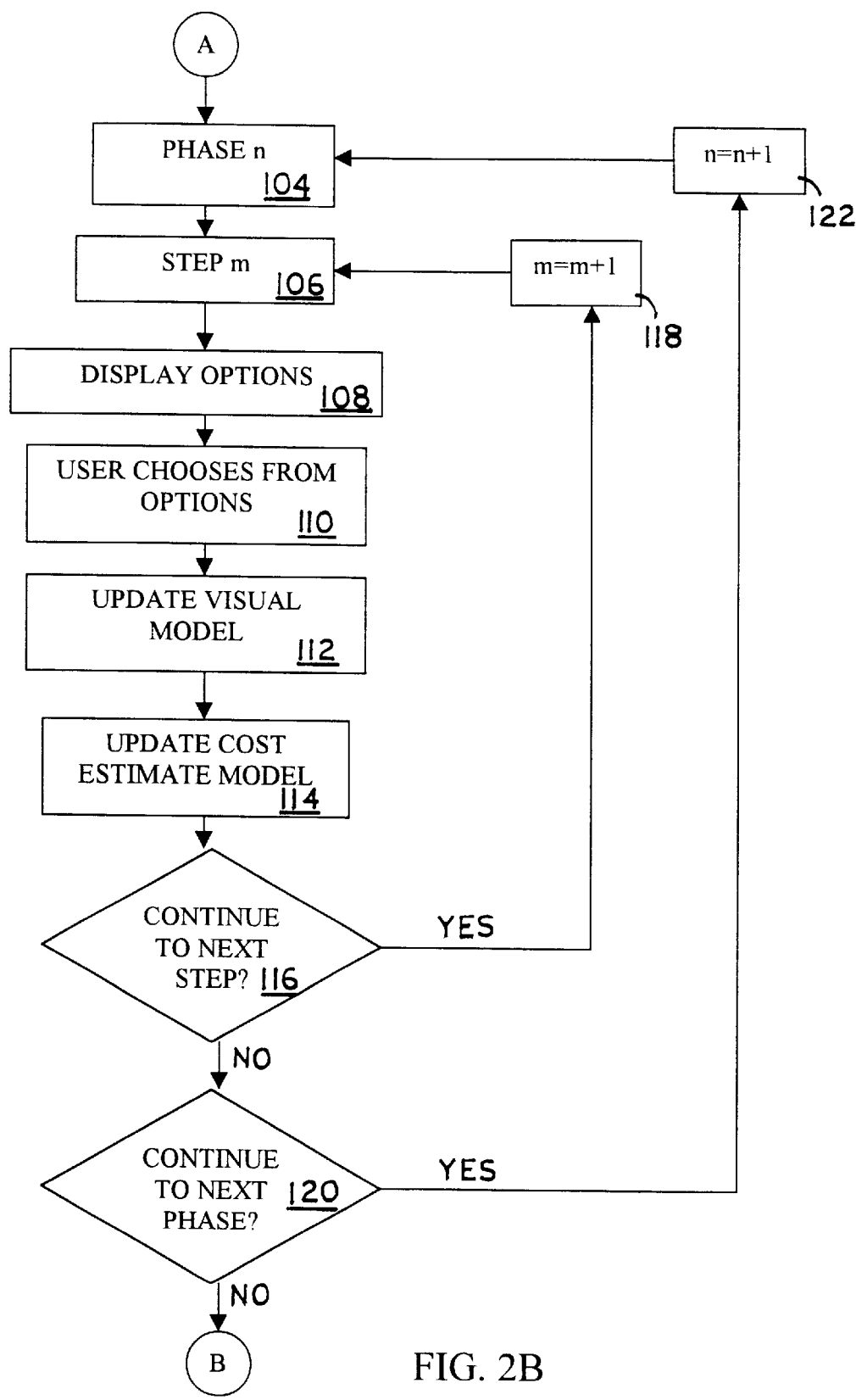

The user is then guided through a complete series of critical construction phases at 104 (FIG. 2B). Each construction phase consists of one or more steps 106. The user computer displays options appropriate to the immediate phase and step at 108. The user is prompted to make a selection at 110. The user computer then uses the information to update the existing visual and cost estimate models in memory at 112 and 114. The user computer also displays the updated visual and cost estimate models on the display screen.

Figure 3:
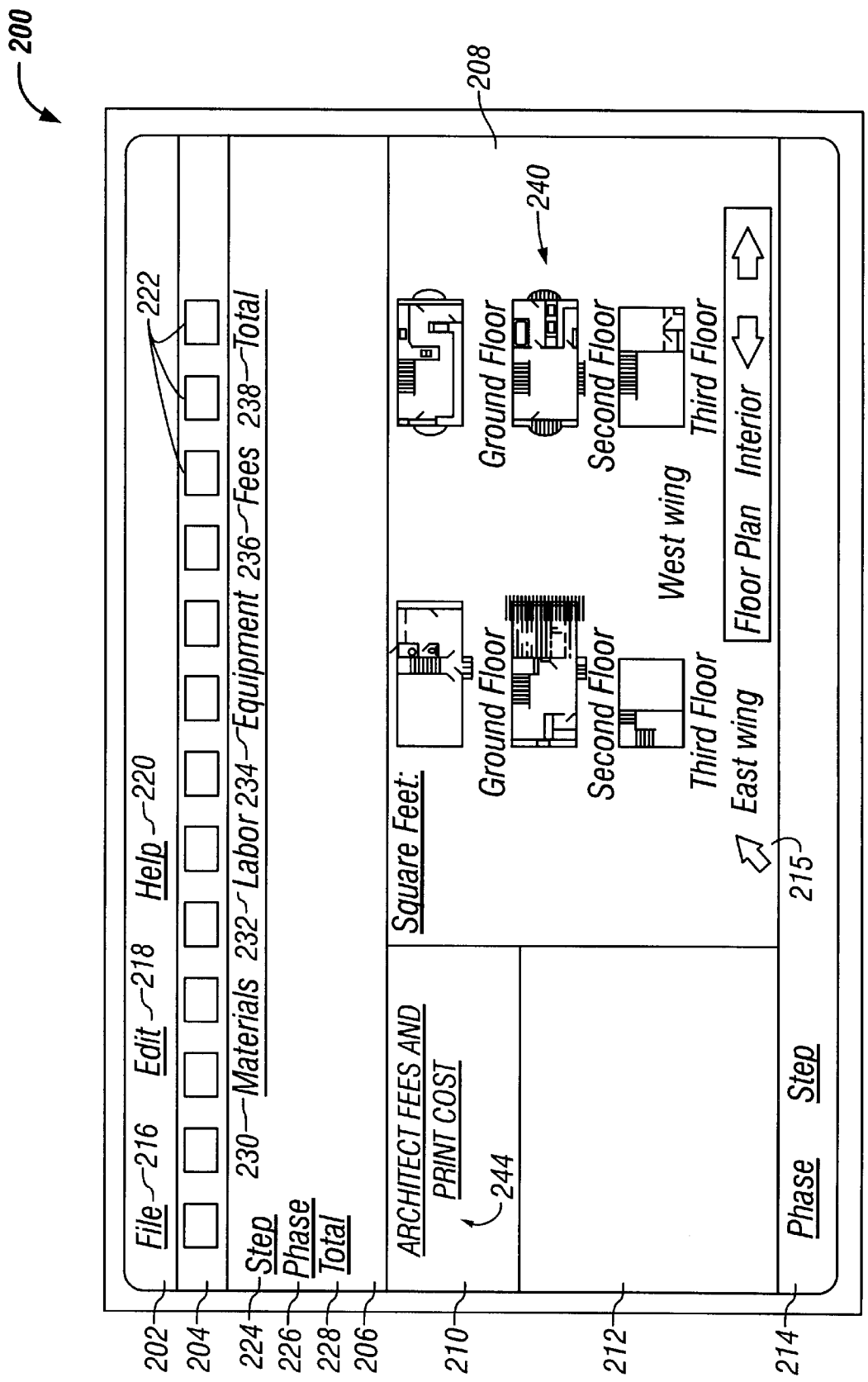
FIG. 3 is a representation of a display screen corresponding to a particular construction step according to another embodiment of the invention.

FIG. 3 illustrates a display screen 200 at the user computer according to a preferred embodiment of the invention. The display screen is preferably a "windows" type configuration with pull-down and/or pop-up type menus on a menu bar 202. The display screen is compartmentalized into several windows, each window having an area that can be minimized, maximized, closed, and stretched and/or compressed. The display screen includes the menu bar, a tool bar 204, a cost estimate window 206, graphical model window 208, prompt window 210, a product data window 212, and a phase/step indicating bar 214. Items in the display window can be selected with a pointing device 215.

Menu bar 202 includes a file menu 216 that contains commands for manipulating the file, such as saving, printing, or sending the file electronically. The menu bar also includes an edit menu 218 that contains commands for manipulating the graphical model and cost estimate model and navigating through the various phases and steps of the process. The menu bar also includes a help menu 220 that contains commands for accessing files that provide assistance in using the application.

Tool bar 204 includes virtual buttons 222 that act as shortcuts for many of the most often used commands in the menus of the menu bar.

Cost estimate window 206 includes cost fields for step 224, phase 226, and running total for the project 228. The cost estimate window also includes fields for material 230, labor 232, equipment 234, fees 236, and running total 238 of these fields.

Graphical model window 208 displays a digital image 240 of the portion of the project appropriate to the immediate phase and step. The digital image may be derived from a scanned photograph or from construction plans including floor and elevation plans. The digital image can be manipulated to add or remove features and materials, change dimensions, and may include animation. Items in the graphical model window can be selected with pointing device 215.

Prompt window 210 contains prompts 244 instructing the user to make a selection or otherwise input information appropriate to the immediate step and phase. The prompt window may also include instructions, recommendations, and warnings designed to guide the user to make the best selection for his project.

Product data window 212 includes information on products to be incorporated into the graphical model corresponding to the prompts in the prompt window. The product data 246 may include product type, product description, product identifying code, supplier name, supplier contact information, cost-per-unit, and a digital image of the product 248.

Phase/step indicating bar 214 indicates the immediate step and phase the user is working in.

Table 1 list the phases and steps in a typical construction project for building a house.

TABLE 1

Critical Phases in a Housing Construction Project

| Phase | Step | Description |
|---|---|---|
| 1 | | General Requirements |
| | 1 | Architect's fees and print costs |
| | 2 | Building permits, temporary facilities (electric, water, toilets) |
| | 3 | County dump and dump truck |
| | 4 | Continuous cleanup |
| | 5 | Supervision |
| 2 | | Begin Site Work |
| | 1 | Excavation |
| | 2 | Rough grading |
| | 3 | Trenching |
| | 4 | Underground utilities |
| | 5 | Sewers and drains |
| | 6 | Septic tank |
| | 7 | Drainage and culverts |
| 3 | | Begin Concrete |
| | 1 | Designate raised flooring or not |
| | 1 | Formwork |
| | 2 | Designate concrete psi |
| | 3 | Pour correct cubic yards of concrete |
| 4 | | Begin Masonry |
| | 1 | Designate work to be accomplished (fireplace, retaining wall, BBQ) |
| | 2 | Designate and install materials to be used |
| 5 | | Begin Framework |
| | 1 | Designate measurements for wall lengths and heights |
| | 2 | Designate measurements for roof (pitch, rafter length) |
| | 3 | Designate floor plan |
| | 4 | Install a raised flooring (if applicable) |
| | 5 | Install porches and trellises |
| | 6 | Designate and install cabinet with location, style |
| 6 | | Begin Thermal and Moisture Protection |
| | 1 | Calculate insulation costs |
| | 2 | Designate and install roofing materials (shingles, tiles, metal, etc.) |
| | 3 | Designate and install gutters/down spouts |
| | 4 | Designate and install skylights or not |
| 7 | | Begin Doors and Windows |
| | 1 | Designate and install interior and exterior doors |
| | 2 | Designate and install garage doors and other roll-up doors |
| | 3 | Designate and install sliding doors |
| | 4 | Designate and install windows (metal and wood frame) |
| | 5 | Designate and install mirrors |
| 8 | | Begin Wall and Floor Covering |
| | 1 | Designate and install wall coverings (interior and exterior) |
| | 2 | Designate and install floor covering |
| | 3 | Designate and install tile work (kitchen, bathrooms, fountains, etc.) |
| 9 | | Begin Specialties |
| | 1 | Designate and install prefabricated fireplace and Fireplace doors |
| | 2 | Designate and install bathroom accessories |
| | 3 | Designate and install tub/shower enclosure |
| 10 | | Begin Appliance/Equipment Installation |
| | 1 | Designate and install appliances and/or equipment |
| 11 | | Begin Plumbing Installation |
| | 1 | Designate and install fire sprinklers or not |
| | 2 | Designate and install plumbing fixtures |
| | 3 | Designate and install water and drain lines to fixtures |
| 12 | | Begin Heating, Ventilation, and Air Conditioning (HVAC) |
| | 1 | Designate and install HVAC or not |
| 13 | | Begin Electrical Fixture Installation |
| | 1 | Designate and install lighting fixtures |
| | 2 | Designate and install telephone jack location and phones |
| | 3 | Designate and install cable television/stereo wiring |
| 14 | | Begin Landscaping |
| | 1 | Designate and install plants and ground cover |
| | 2 | Designate a preset landscape design |

Once the site has been established, the application guides the user through the steps of Phase 1: General Requirements. In Step 1: Architect's Fees and Print Costs, the user is prompted to input basic plans for the structure including floor and elevation plans. These may be input externally from a removable disc drive, selected from plans stored in the user computer's memory, or accessed through the central site plan database 40. User computer 42 then accesses regional database 38 at the central site. The user computer retrieves an average architect labor rate and average print costs per sheet or project and then calculates an estimated architect fees and print costs for the project from that information. These fees and costs are then entered into step field 224, phase field 226, and total field 228 in the cost estimate model and displayed in cost estimate window 206 as shown in FIG. 3. Step field 224 contains the estimated cost for the immediate step. Phase field 226 contains the estimated cost for the immediate phase which is the sum of the immediate step and all prior steps in that phase. Total field 228 contains the sum of costs of the immediate phase and all prior phases completed. Once Step 1 is completed, the user computer guides the user through the next step, Step 2: Building Permits, Temporary Facilities in 116 and 118 (FIG. 2B).

In Step 2, user computer 42 accesses regional database 38 at the central site. Using the user entered regional data in memory as a database query, the user computer searches regional database 38 for the appropriate building permit fees and average temporary utility fees for the selected region. The user computer then stores and displays these fees and costs in step field 224 of cost estimate window 206. The user computer adds these fees and costs to the values in the phase field and total field 228, stores them in the cost estimate model in memory, and displays the new values in the cost estimate window of the display screen. The user computer guides the user through the remaining steps in Phase 1 in a similar manner.

After Phase 1 is complete, the application guides the user through the next phase, Phase 2: Begin Site Work in 120 and 122. The initial site is displayed in the graphical model window. In Step 1: Excavation, the application retrieves the square footage of the lot from memory, accesses the regional database, determines average labor rate for excavation subcontractors in that region, determines equipment costs for excavation in that region, and then calculates an estimate for the excavation step. The equipment costs may include rental, fuel, and insurance costs. This estimate is entered in the step and phase fields and added to the total field in the cost estimate model in memory. The updated cost estimate model is then displayed in cost estimate window 206.

Manipulation and animation of digital images is well known. The digital image of the lot is modified to simulate a properly excavated site. In the preferred embodiment, the digital image in graphical model window 208 is animated as it is being modified. Watching the work being performed can help the user better understand the building process. Animated crews use equipment suited to the specific construction step. For example, the site work crew is animated with tractors and back hoes to level and trench the site.

The application then guides the user through the remainder of steps in Phase 2 in a manner similar to that described for Phase 1.

In Phases 3 to 14 the user must select materials. This can be accomplished in several ways, depending on the nature of the material and priorities of the user. According to the preferred embodiment, some materials are prompted for selection and then incorporated into the graphical model and cost estimate model. Other types of materials are selected automatically for the user in a quantity determined by the specifications of the building plans and incorporated into the graphical model and cost estimate model.

Figure 4:
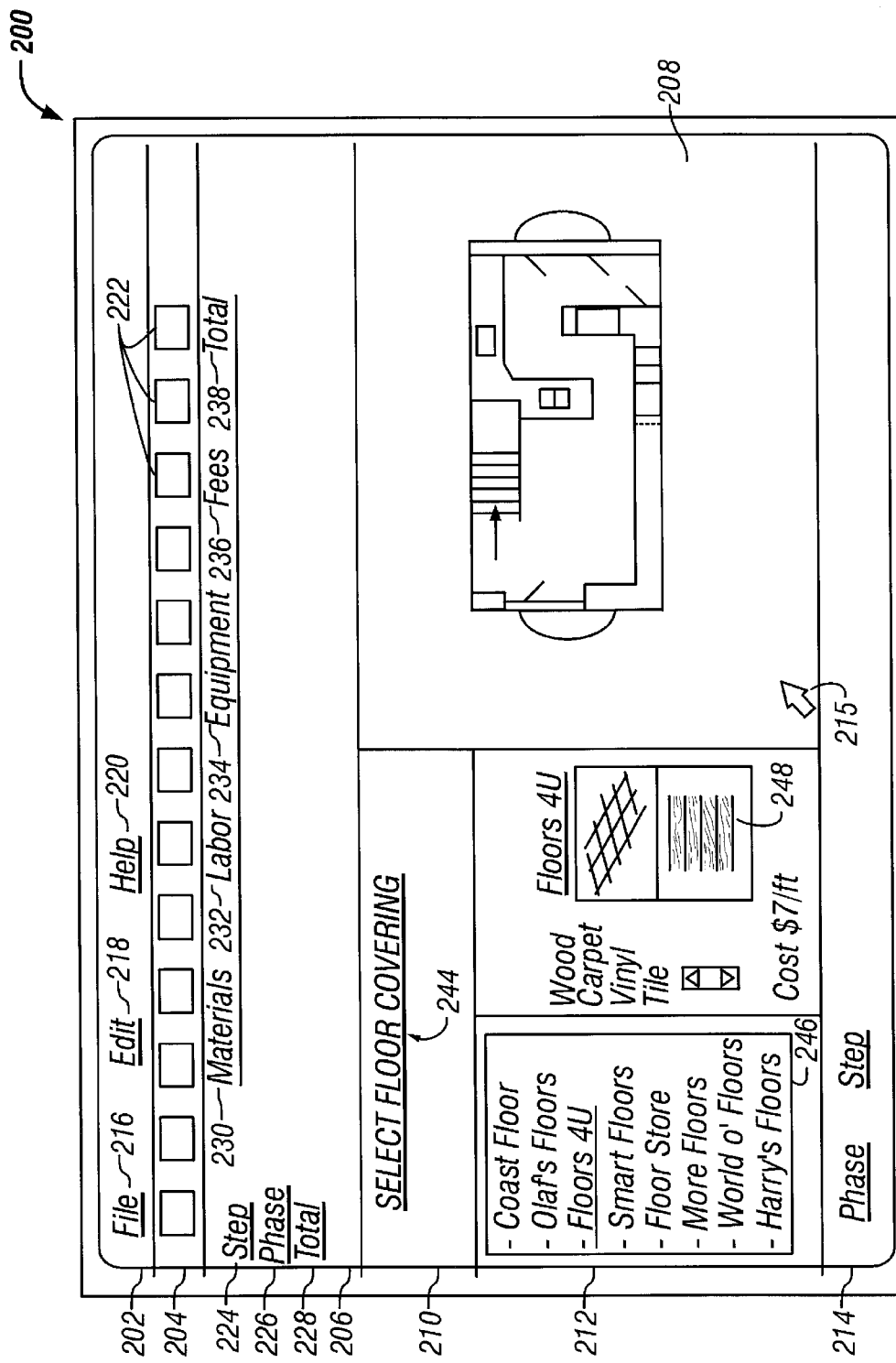
FIG. 4 is a representation of a display screen corresponding to another construction step according to the embodiment of FIG. 3.
Figure 5:
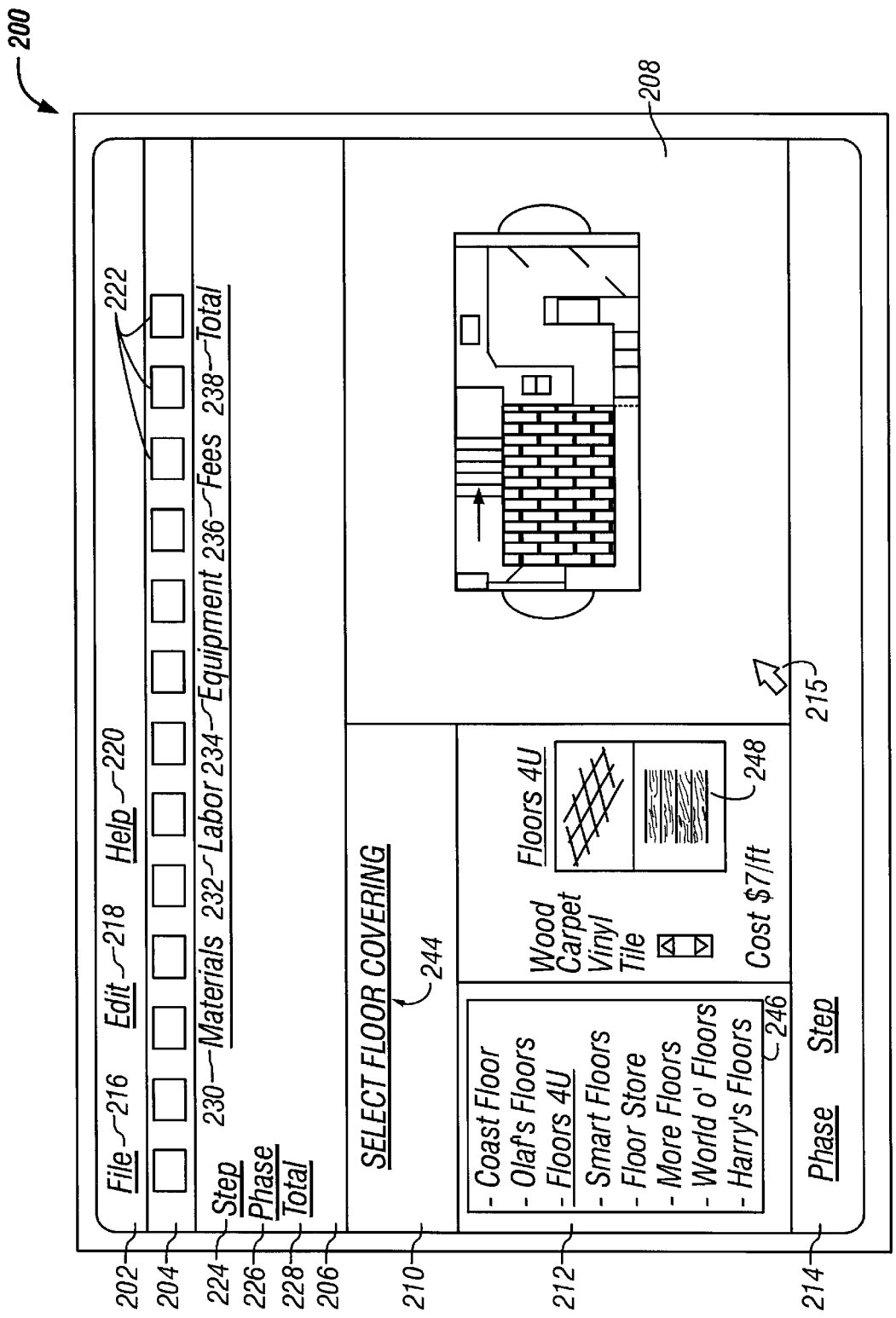
FIG. 5 is a representation of a display screen corresponding to the completed construction step of FIG. 4.

Materials that have a considerable effect on the overall aesthetics of the house, such as carpeting, tile, wall, paper, trim, aluminum siding, and exposed brick, are prompted for selection in the prompt window. FIG. 4 illustrates such a prompt for Phase 8: Wall and Floor Coverings, Step 2: Install Floor Covering. The user has selected Main Floor Dining Room in the graphical model window, which at this point is blank. The prompt "Select Floor Covering for Main Floor Dining Room" is displayed in a top section of prompt window. A list of competing local suppliers is displayed in a lower left section of the prompt window, and the supplier "Floors 4U" is highlighted. Product data for floor covering products offered by Floors 4U are displayed in lower right section of the prompt window. The product data includes the name of the product, the cost-per-unit, and a digital image of the product. Upon the user selecting the desired floor covering, the user computer applies the selected floor covering to the entire area of the Main Floor Dining Room in the graphical model as shown in FIG. 5. Again, the application of the flooring may be animated with representations of a construction crew installing the new flooring. The user computer simultaneous calculates the square footage of the Main Floor Dining Room from the user input floor plans in memory, and calculates the required material quantity and the associated material cost from the cost-per-unit data. The user computer also accesses local tax rate from the regional database, calculates the appropriate tax, and adds this into the material cost.

The user computer then calculates estimated labor costs from the square footage and average regional labor rate for flooring contractors from the regional database. The labor rate in the regional database is preferably in the form of average price-per-square foot. However, it may be stored as price-per-hour. If so, the user computer calculates an estimated time for the flooring installation from the square footage of the floor to be covered and an installation time factor. The installation time factor has the dimensions time-per-square foot. A number of different installation time factors for different construction steps are stored in the user computer memory at the time the application is installed.

These costs are incorporated into the cost estimate model. The application then displays the total cost for the installation in step field 224 and adds the cost to the phase field 226 and total field 228 in the cost estimate window. At this time, if the user is not satisfied with the appearance and/or cost of the installation, the user can undo the operation and simulate another installation. If the user is satisfied with the installation, the user computer moves on to the next step, updating and storing the revised graphical model and cost estimate model.

For some materials appearance is not an issue, either because they have a relatively standard appearance, such as concrete, or are hidden, such as structural lumber. For these materials, it is not necessary to include a digital image in the product data, but it may still be desired. Concrete work is performed in Phase 3 and framework in Phase 5. For these phases, the user is given a choice of the quality of concrete or framing to construct. The quality choices include "high quality", "above standard", and "standard". The high quality choice gives the user a cost allowance for the highest quality of materials and design to be used. The above standard quality choice gives the user a cost allowance for materials and design that are above average. The standard quality choice gives the user a cost allowance for materials and design that fit standard requirements.

Minor supplies such as nails, studs, hinges, and minor fixtures such as outlet covers that would be too time consuming for the user to select are incorporated into the proposal automatically based on average requirements per square foot stored in the user computer memory or accessed from plan database 40.

The previous example describes a project which entails building an entire house from the ground up. The user is guided through all of Phases 1–14. A remodeling project would not require all of these phases. For a remodel, the user selects the appropriate phase and step for the remodel. The starting point for the simulation can be selected from the menu bar by specifying the desired phase and step at which the project should begin. The application prompts the user for the appropriate initial graphical model. For example, if the remodeling project is replacing the carpet in all second floor bedrooms, the user computer prompts the user to input the floor plans for the second story of the house. The user may have the original plans for the house transferred to digital form and input into the user computer. If the original plans are not available, similar plans can be selected from the plans resident in the user computer memory or accessed from the plan database and modified to serve as a template for the simulated project. The initial graphical model for the remodel may also be derived from a photograph that is scanned into the user computer as a digital image. As described above, the image scanning process can be done at the user site or the central site.

Figure 6:
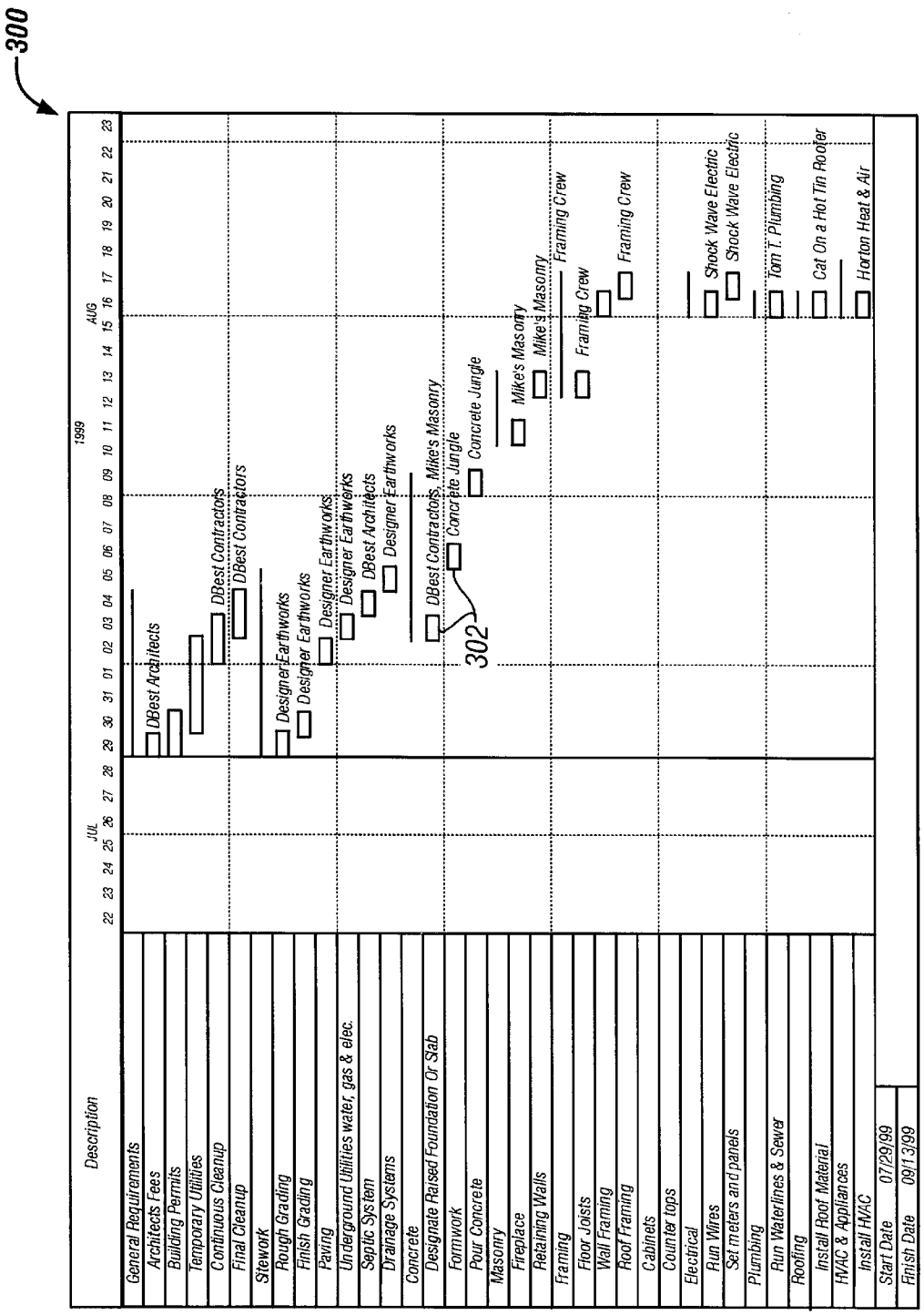
FIG. 6 is a representation of a display screen including a timeline according to another embodiment of the invention.

According to the preferred embodiment, the proposal includes a time line 300. A portion of the time line is shown in FIG. 6. As described above, the user computer has installation time factors for the different construction steps stored in memory. Using the appropriate installation time factor and square footage of the installation, the user computer calculates an estimated time for each construction step and stores it in a time estimate model. The time estimates 302 for the various construction phases and steps are displayed in the timeline. The user computer organizes these time estimates according to the proper order in a construction project. For example, framing (Phase 5) must be completed before other phases can commence, however, some of the following phases can commence simultaneously, such as plumbing and framing.

Figure 2C:
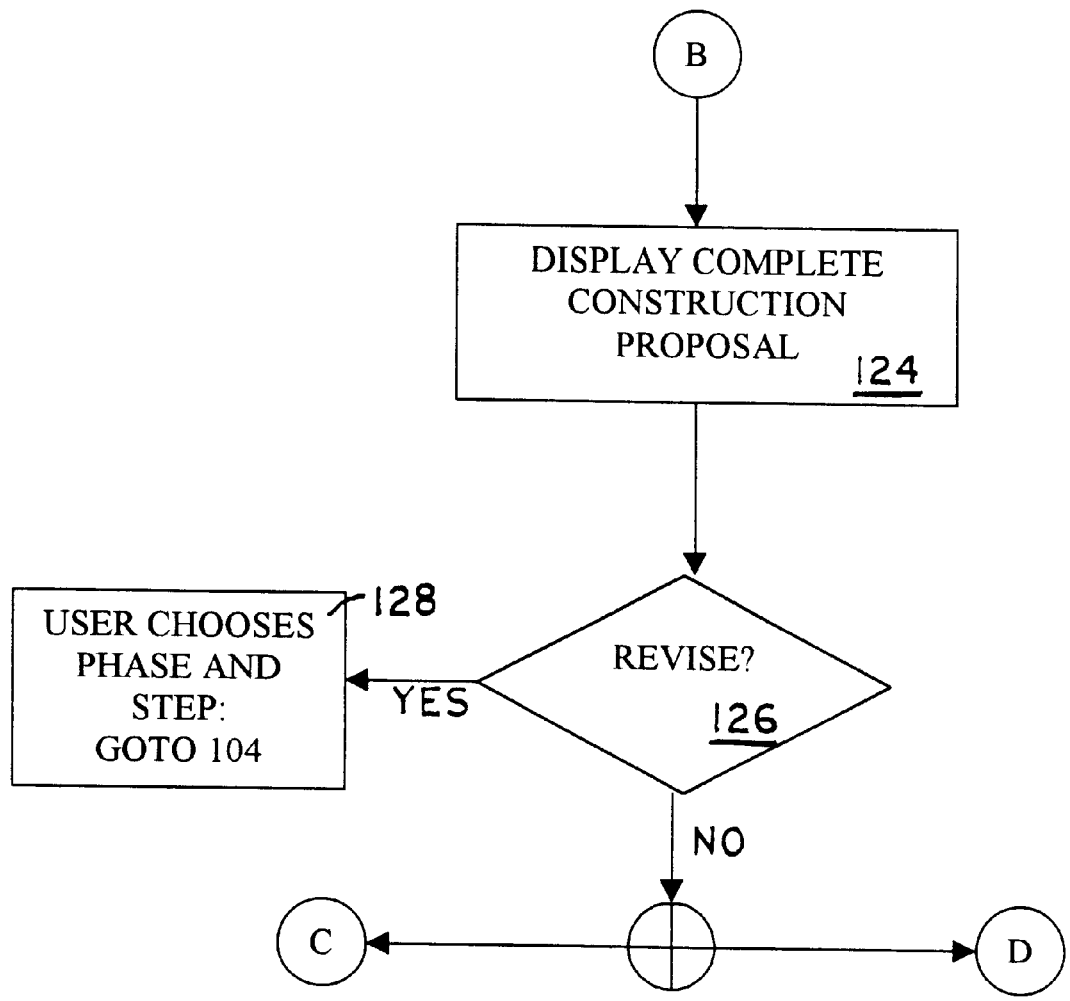

Once the user has been guided through all of the phases and steps appropriate to his project, he can display and navigate the completed construction proposal at step 124 (FIG. 2C). If any feature of the proposal is unsatisfactory, the user can revise the proposal at 126. The user selects the phases and steps he wishes to edit at 128 and edits the proposal at those points.

Figure 2D:
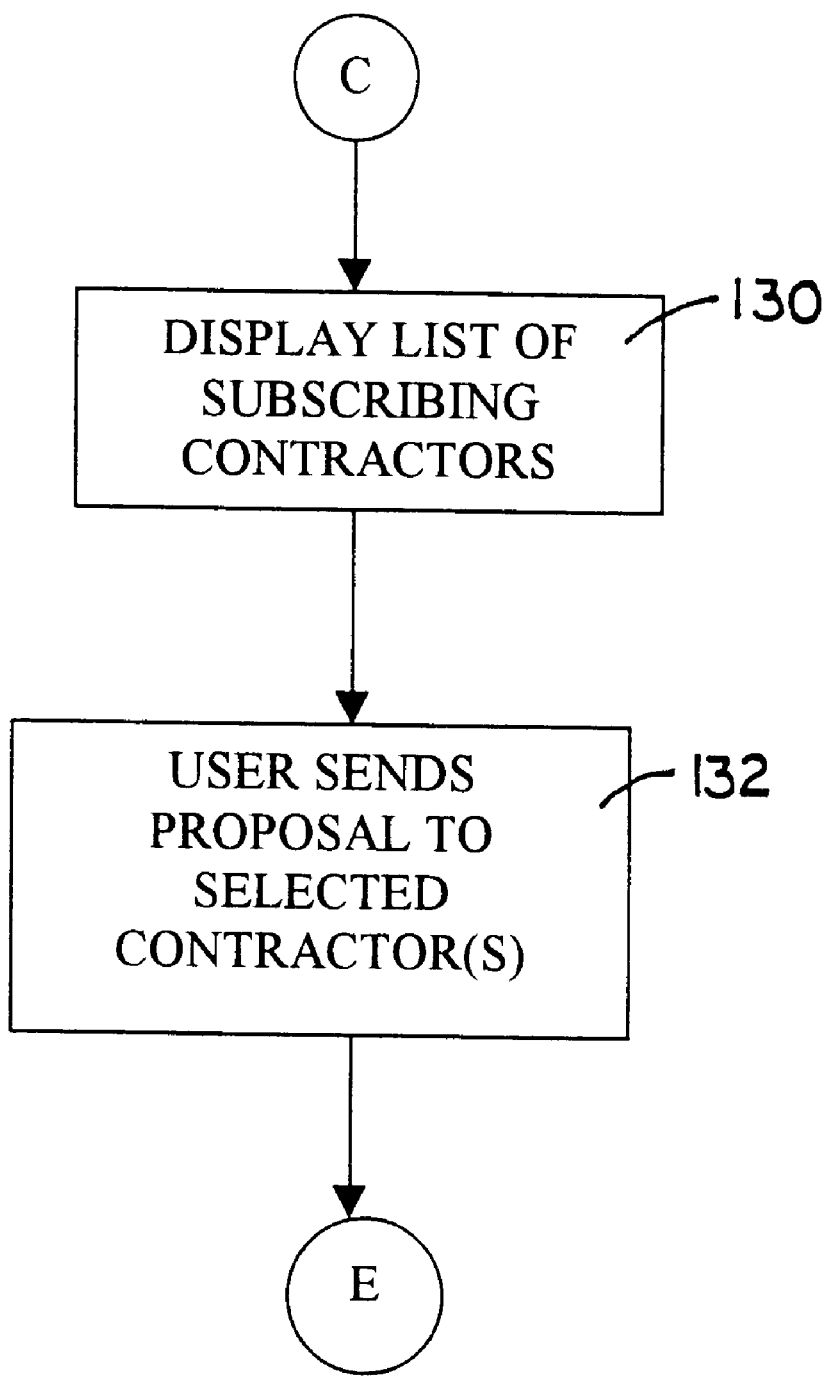

Once the proposal is complete to the user's satisfaction, the application prepares it for submission as shown in FIG. 2D. The user may either select a general contractor to which to send the bid, or decide to forego a general contractor and submit bids to individual subcontractors. In either case, the contractor database is searched for contractors in the designated geographic area. Each contractor tends to bid differently. By sending the proposal to several contractors, the user can compare prices for different contractors for his project.

If the user selects to use a general contractor, the user computer searches the contractor database at the central site for general contractors in the user's region, retrieves contact information for those general contractors, and displays the contact information on the user's display device at 130 (FIG. 2D).

If the user decides to forego a general contractor, the application determines the type of subcontractors required for the proposed project. As described above, different phases require different subcontractors. Depending on which phases and steps the project entails, the application recommends appropriate subcontractor types. The user computer then searches the contractor database with a query including subcontractor specialty and region. The user computer retrieves the contact data for the subcontractors resulting from the query and displays them on the user's display device at 130.

For some contractors, such as architects, location is not an issue since they do not need to physically be at the building site. Other factors such as the architects availability may be a factor in the selection process.

Once the appropriate contractors have been identified, the proposal can be transmitted to the contractors selected by the user over the networked communication system at 132. The contact information includes the contractors' physical address and telephone number as well as electronic address for communication over networked communication system 16. It may be desirable to prompt the user to call a contractor before sending the proposal electronically to determine if the contractor is interested in considering the proposal. The proposal can be a relatively large file. Accordingly, it is desirable for both the user and contractor to be connected to the networked communication system over a wide bandwidth transmission line, preferably a digital line such as a DSL or cable connection.

Figure 2E:
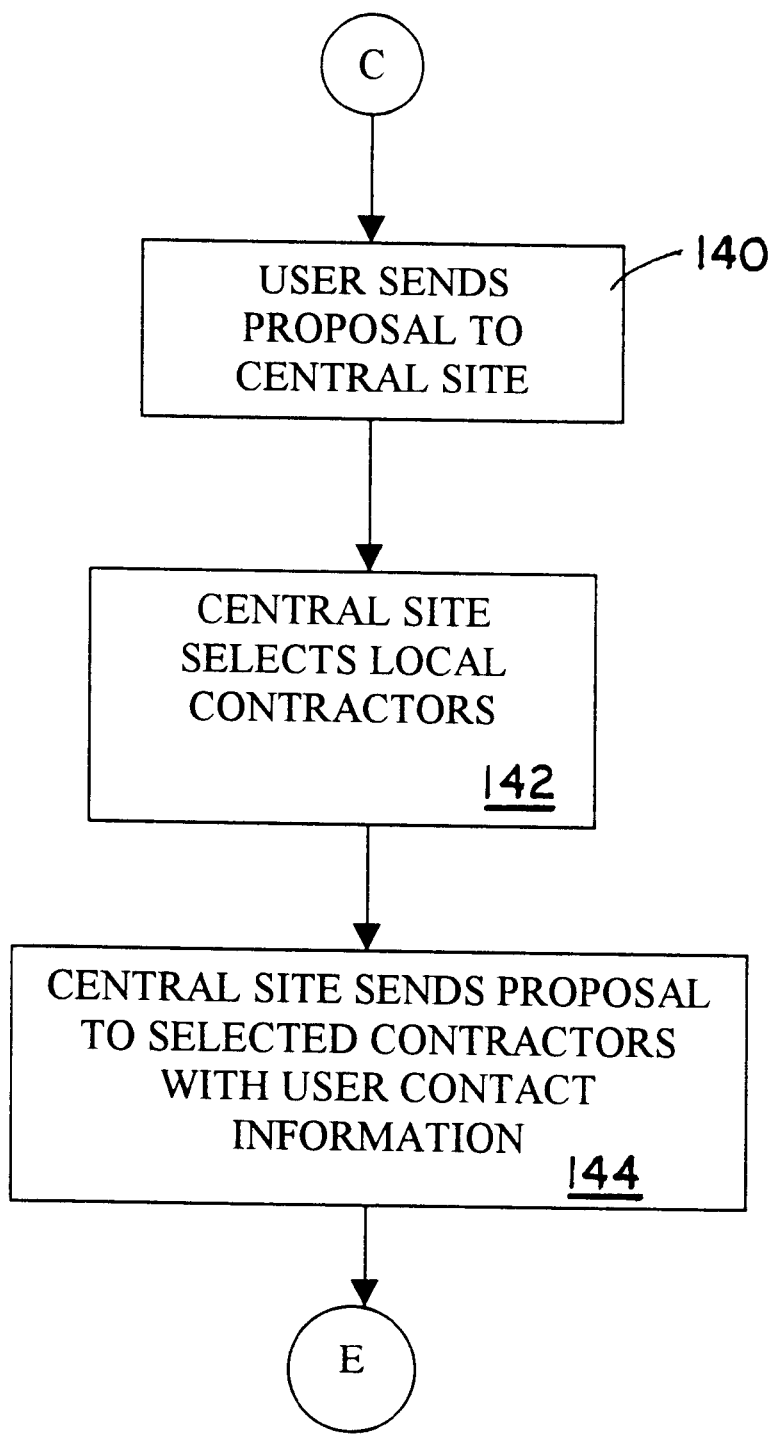
Figure 2F:
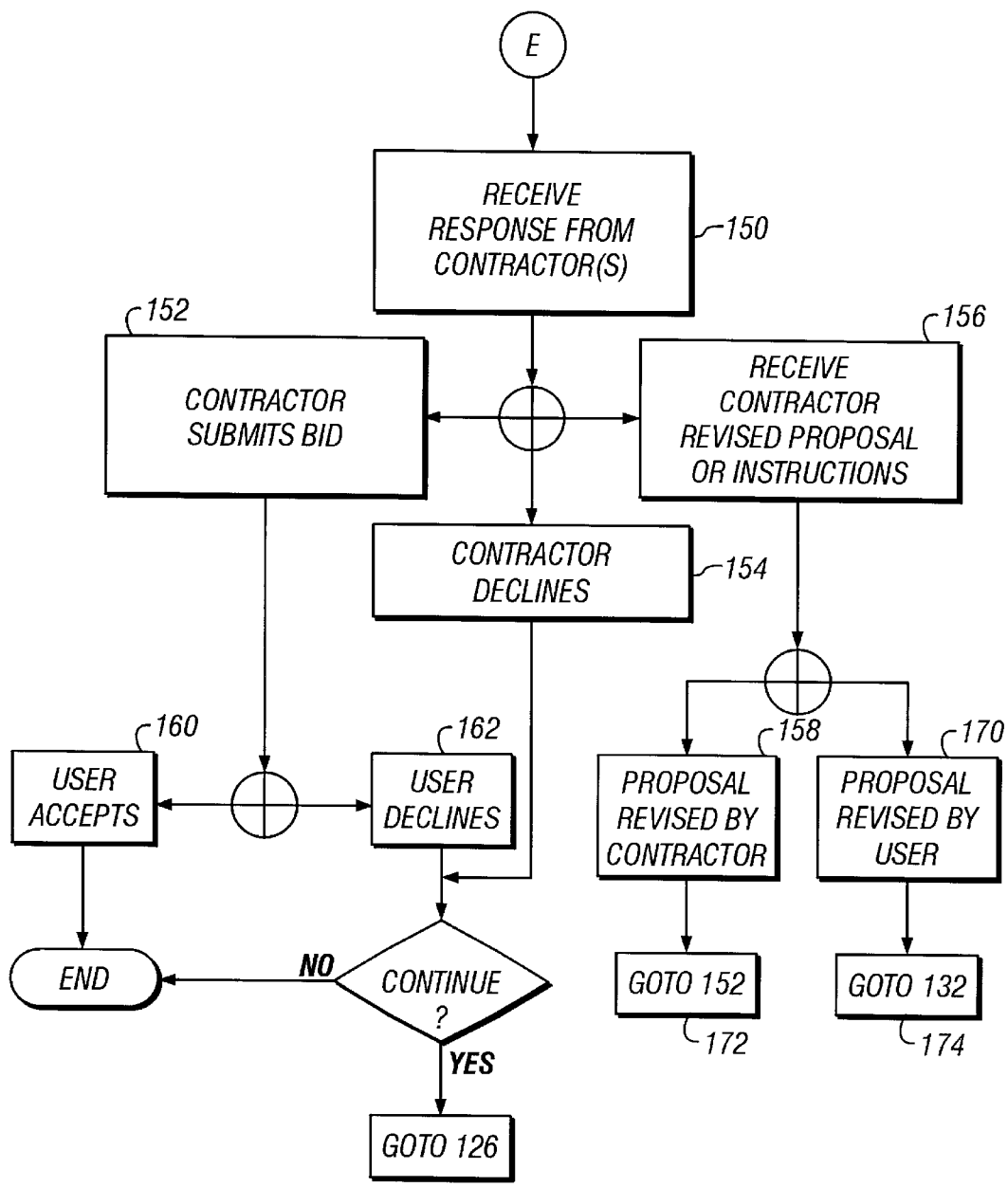

According to an alternate embodiment shown in FIG. 2E, the user can submits the proposal directly to the central site 140. The user identifies the geographic location of the building site and his desire to hire a general contractor or to receive subcontractor bids directly. Regional contractors are selected as described above at the central site and the user's proposal submitted to the selected contractors without the user's intervention at steps 142 and 144.

Once the subcontractor or general contractor receives the bid they may review it and respond to it. Subscribing contractors have software application installed on their computers that enables them to view and navigate the user's proposal package. Preferably the contractors are also able to edit the proposal and/or attach notes to the proposal.

In step 150 (FIG. 2F), the user receives a response from the contractor. In the simplest case, the contractor receives the bid, reviews it and submits a bid at 152 or declines the proposal at 154 via the networked communication system. If the contractor is interested in the proposal yet some of the user choices are not feasible or practical, the contractor may revise the proposal or provide notes to that effect at 156 and transmit the revised proposal to the user at 158 with a bid via the networked communication system as a counteroffer at 172.

According to another embodiment, the contractor can contact the user directly and revise the proposal in a real time connection with the user over the networked communication system. Preferably, the proposal is displayed simultaneously on the user computer display screen and the contractor's computer display screen as the contractor manipulates the proposal. Preferably a comment window is also displayed in which the user and contractor can communicate with written notes in a real time, on-line dialogue.

After the user receives the bid, he can accept at 160 or decline the offer at 162, or alternatively, receive instructions, revise the proposal at 170 and resubmit it at 174.

Although the present invention has been described in considerable detail with reference to certain preferred versions thereof, numerous variations in organization and operation will suggest themselves to those skilled in the art without departing from the principles of the invention. The construction projects that are suited for the above-described method and system are not limited to the construction of living structures. Any construction project that follows a set sequence, requires a detailed graphical model and cost estimate model, and requires other professionals to carry out the actual construction of the project will lend itself to the inventive method and system of the present invention. For example, the invention could be modified to encompass construction projects as varied as building a customized surfboard to planning a wedding. Accordingly, the preferred versions of the invention illustrated and described above should be considered as exemplary only, and the spirit and scope of the appended claims should not be limited to the description of the preferred versions contained herein.

I claim:

1. A computer implemented method for creating a construction proposal, said proposal comprising a graphical model of a proposed construction project and cost estimate model for the proposed construction project, and electronically submitting the proposal to a construction professional for bidding, the method comprising the steps of:

(a) providing a first database having stored therein a plurality of product descriptions from a plurality of subscribing suppliers, each product description comprising a digital image and a cost-per-unit data for a particular product;

(b) providing a second database having stored therein contact information for each of a plurality of subscribing construction professionals;

(c) creating an initial graphical model and storing it in a first memory;

(d) creating an initial cost estimate model and storing it in a second memory;

(e) prompting the user to create the construction proposal in a plurality of construction phases, each construction phase comprising a plurality of construction steps;

(f) accessing product descriptions from the first database associated with a particular one of the construction steps for user selection;

(g) updating the graphical model by incorporating the digital image of a selected product description into an existing graphical model created in a previous construction step, and storing the updated graphical model in the first memory;

(h) updating the cost estimate model by calculating a cost of the selected product from the corresponding cost-per-unit data, incorporating the cost into an existing cost estimate model created in a previous construction step, and storing the updated cost estimate model in the second memory;

(i) displaying a completed construction proposal on a display device;

(j) accessing the second database and displaying the contact information of at least one construction professional; and (k) electronically transmitting said completed construction proposal to at least one user selected construction professional.

2. The computer implemented method of claim 1 further comprising the step of electronically receiving and displaying a bid from the at least one user selected construction professional.

3. The computer implemented method of claim 1 further comprising the steps of providing a third database comprising a labor cost-per-unit data for each of a plurality of types of construction professionals;

selecting a type of construction professional associated with a particular construction step;

accessing the third database and retrieving a labor cost-per-unit data corresponding to the selected type of construction professional;

calculating a labor cost from said labor cost-per-unit data for the particular construction step;

incorporating said labor cost into an existing cost estimate model created in a previous construction step; and storing the updated cost estimate model in the second memory.

4. The computer implemented method of claim 3 wherein the type of construction professional is selected based on locality and specialty.

5. A computer implemented method for creating a construction proposal, said proposal comprising a graphical model of a proposed construction project and cost estimate model for the proposed construction project, and electronically submitting the proposal to a construction professional for bidding, the method comprising the steps of:

(a) providing a first database having stored therein a plurality of product descriptions from a plurality of subscribing suppliers, each product description comprising a digital image and a cost-per-unit data for a particular product;

(b) providing a second database having stored therein specialty data for each of a plurality of subscribing construction professionals;

at a user site, (c) creating an initial graphical model and storing it in a first memory;

(d) creating an initial cost estimate model and storing it in a second memory;

(e) prompting the user to create the construction model in a plurality of construction phases, each construction phase comprising a plurality of construction steps;

(f) accessing product descriptions from the first database corresponding to a particular one of the construction steps for user selection;

(g) updating the graphical model by incorporating the digital image of a selected product description into an existing graphical model created in a previous construction step and storing the updated graphical model in the first memory;

(h) updating the cost estimate model by calculating a cost of the selected product from the corresponding cost-per-unit data, incorporating the cost into an existing cost estimate model created in a previous construction step, and storing the updated cost estimate model in the second memory;

(i) displaying a completed construction model on a display device;

(j) prompting the user to submit the completed construction proposal;

at a central processing site, (k) receiving the proposal from the user site;

(l) accessing the second database and selecting at least one available construction professional based on a require specialty for the construction project;

(m) electronically transmitting said completed construction model to the at least one selected construction professional;

(n) electronically receiving a bid from said at least one selected construction professional; and (o) electronically transmitting said bid to the user.

6. The computer implemented method of claim 5 wherein the second database further comprises location data for each of the plurality of subscribing construction professionals, and further comprising the steps of:

at the user site, prompting the user to select a desired location; and selecting the at least one construction professional based on the desired location.

7. A computerized system for a user to create a construction proposal package comprising a graphical model of a construction project and a cost estimate model of a construction project and submit said proposal electronically to a construction professional for bidding, the system comprising:

a central site comprising a first database, means for receiving a plurality of product descriptions from a plurality of subscribing suppliers, each product description comprising a digital image and a cost-per-unit data for a particular product and storing said plurality of product descriptions in the first database, a second database comprising contact data for each of a plurality of subscribing construction professionals, means for communicating electronically with a remote computer system; and a user site comprising a computer system comprising a display device, a first memory, a second memory, a third memory having stored thereon microprocessor control instructions, a modem, and a microprocessor electronically coupled to the display device, the first memory, the second memory, the third memory, and the modem and controlled by the control instructions to provide means for prompting the user to create the construction model in a plurality of construction phases, each construction phase comprising a plurality of construction steps, means for creating an initial graphical model and storing said initial graphical model in the first memory, means for creating an initial cost estimate model and storing said initial cost estimate model in the second memory, means for accessing product descriptions from the first database corresponding to a particular one of the construction steps for user selection, means for updating the graphical model by incorporating the digital image of a selected product description into an existing graphical model created in a previous construction step and storing the updated graphical model in the first memory, means for updating the cost estimate model by calculating a cost of the selected product description from the corresponding cost-per-unit data, incorporating the cost into an existing cost estimate model created in a previous construction step, and storing the updated cost estimate model in the second memory, means for displaying a completed construction proposal package comprising the updated graphical model in the first memory and the updated cost estimate model in the second database, means for accessing the second database and displaying the contact information of at least one construction professional, and means for electronically transmitting said completed proposal package to at least one user selected construction professional.

8. The computerized system of claim 7 wherein the computer system at the user site further comprises means for electronically receiving and displaying a bid from the at least one user selected construction professional.

9. The computerized system of claim 7 wherein at the central site, the second database further comprises locality data for each of the plurality of subscribing construction professionals, and wherein, at the user site,
the computer system further comprises means for prompting the user to select a desired location,
the means for accessing the second database further comprises means for the selecting at least one construction professional in the desired location, and
the at least one construction professional displayed is located in the desired location.

10. The computerized system of claim 7 wherein, at the central site, the second database further comprises specialty data for each of the plurality of subscribing construction professionals, and wherein, at the user site,
the computer system further comprises means for prompting the user to select a desired specialty,
the means for accessing the second database further comprises means for the selecting at least one construction professional having the desired specialty, and
the at least one construction professional displayed has the desired specialty.

11. The computerized system of claim 7 wherein the central database site further comprises a third database comprising a labor cost-per-unit for each of a plurality of localities, and wherein, at the user site, the computer system further comprises means for prompting the user to select a desired locality, means for accessing the third database and retrieving a labor-per-unit cost corresponding to the desired locality, and means for calculating a labor cost for a particular construction step, incorporating the labor cost into an existing cost estimate model created in a previous construction step, and storing the updated cost estimate model in the second memory.

12. The computerized system of claim 7 wherein the central database site further comprises a third database comprising a construction permit cost for each of a plurality of locations, and wherein, at the user site, the computer system further comprises means for prompting the user to select a desired location, means for accessing the third database and retrieving a permit cost corresponding to the desired location, and means for incorporating the permit cost into an existing cost estimate model created in a previous construction step, and storing the updated cost estimate model in the second memory.

13. The computerized system of claim 7 wherein the computer system at the user site further comprises means for prompting the user to select an initial graphical model from a plurality of templates.

14. The computerized system of claim 7 wherein the computer system at the user site further comprises means for receiving and storing a user input initial graphical model.

15. The computerized system of claim 7 wherein the contact data comprises an electronic address in a networked computer system.

16. The computerized system of claim 15 wherein the contact data further comprises a telephone number.

* * * * *